Feb. 11, 1947.  L. C. BROECKER  2,415,552
PNEUMATIC TORQUE MACHINE
Filed Feb. 19, 1943  4 Sheets-Sheet 1
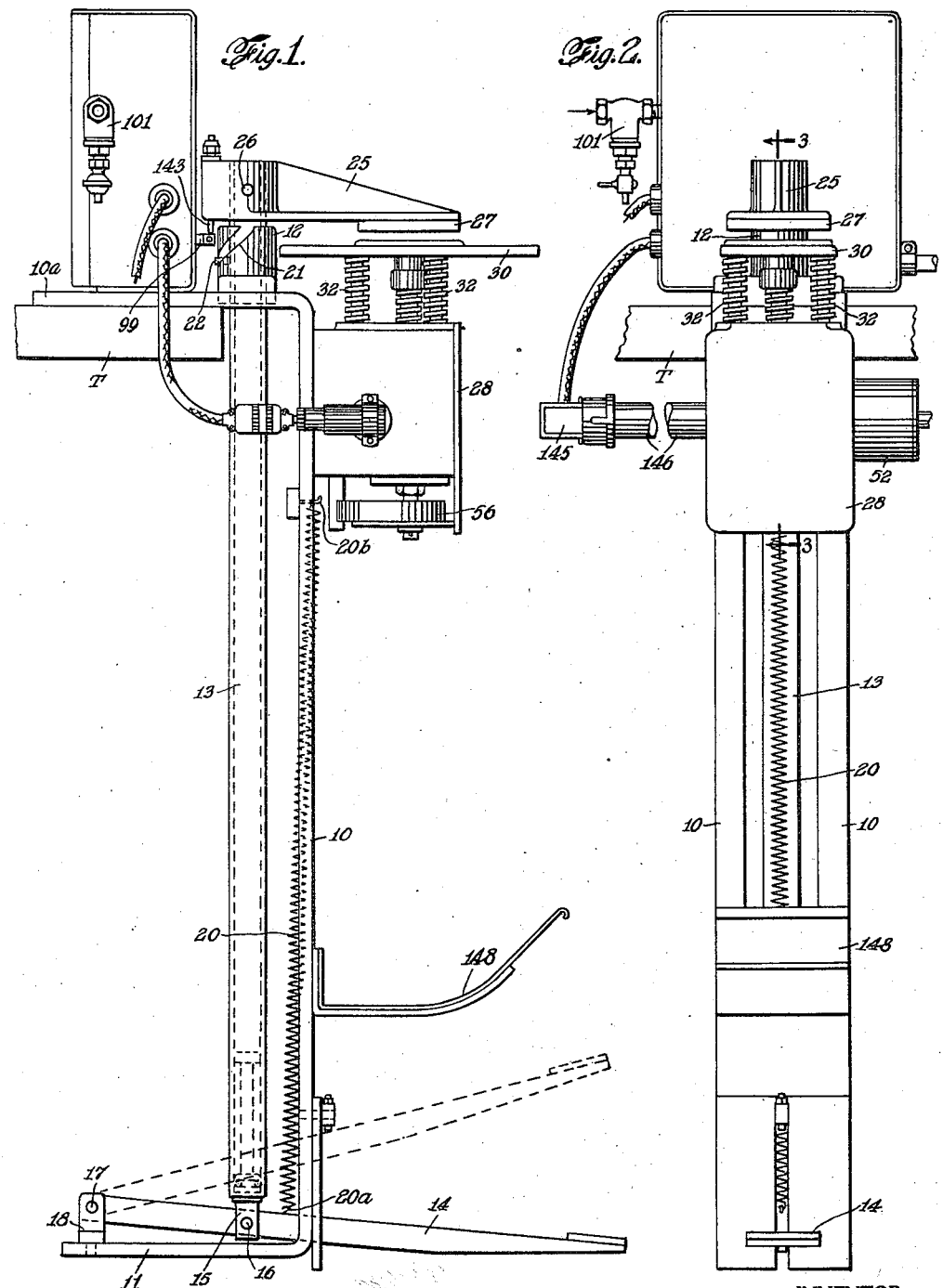
INVENTOR.
Lewis C. Broecker
BY Kenyon & Kenyon
ATTORNEYS.

Feb. 11, 1947.   L. C. BROECKER   2,415,552
PNEUMATIC TORQUE MACHINE
Filed Feb. 19, 1943   4 Sheets-Sheet 2

INVENTOR.
Lewis C. Broecker
Kenyon & Kenyon
ATTORNEYS.

Feb. 11, 1947.  L. C. BROECKER  2,415,552
PNEUMATIC TORQUE MACHINE
Filed Feb. 19, 1943  4 Sheets-Sheet 3

INVENTOR.
Lewis C. Broecker
BY
Kenyon & Kenyon
ATTORNEYS

Feb. 11, 1947. L. C. BROECKER 2,415,552
PNEUMATIC TORQUE MACHINE
Filed Feb. 19, 1943 4 Sheets-Sheet 4
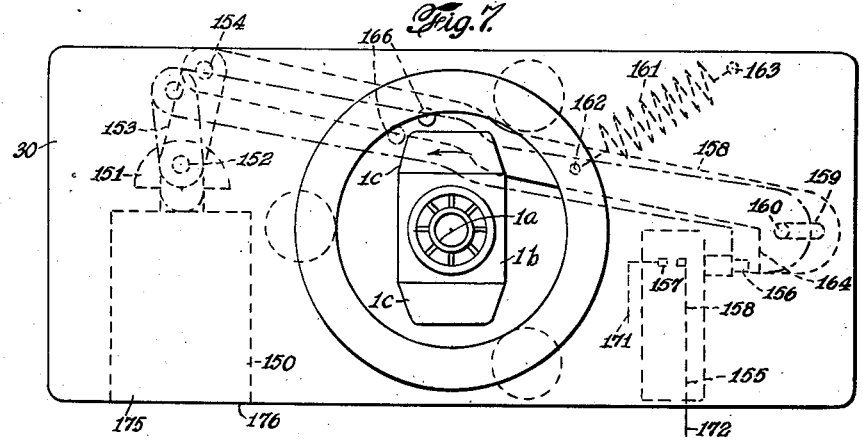
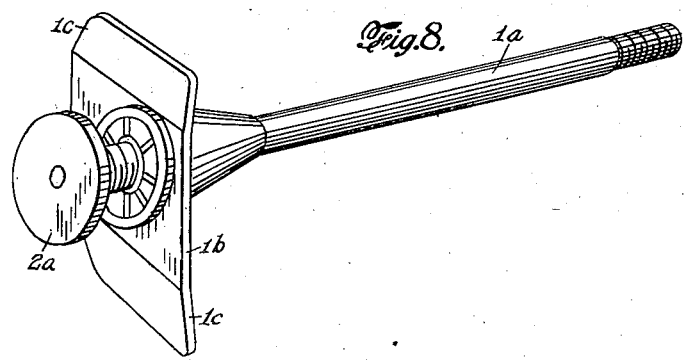
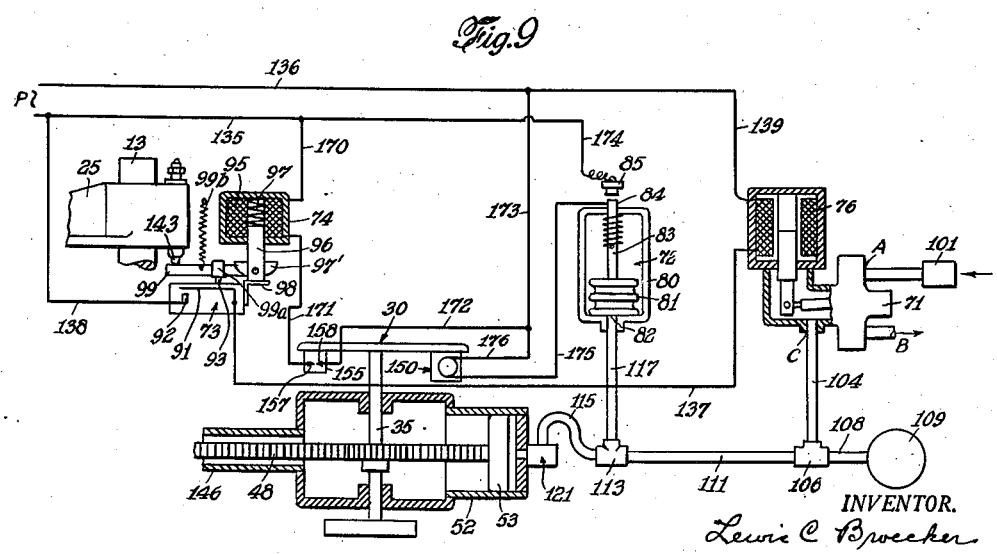
INVENTOR.
Lewis C. Broecker
BY
Kenyon & Kenyon
ATTORNEYS.

Patented Feb. 11, 1947

2,415,552

UNITED STATES PATENT OFFICE 2,415,552

PNEUMATIC TORQUE MACHINE

Lewis C. Broecker, Nichols, Conn., assignor to Bridgeport Brass Company, Bridgeport, Conn., a corporation of Connecticut Application February 19, 1943, Serial No. 476,472

6 Claims. (Cl. 29—240)

1

The present invention relates to pneumatic torque tightening machines, and more particularly to a machine useful in the assembly of valve-stem parts with inner tubes of tires or the like.

In the assembly of valve stems of the detachable type with inner tubes of tires, it has been customary both to assemble the stem parts with the tube and to tighten the parts by hand. This usually has resulted in lack of uniformity in the finished assemblies as well as in frequent damage to the tubes resulting from over-tightening of the valve-stem parts. It is difficult to judge the extent of tightening accurately when it is done by hand. In mass production, uniformly-tightened assemblies are essential and the need for means to ensure such uniformity is apparent.

An object of this invention is to provide a novel machine to which the initially hand-assembled tubes and valve-stem parts may be delivered for the application to each of the parts in assembly of a final tightening operation that will result in uniform tightening of the parts on each tube. This is accomplished in the machine to be presently described by the utilization with it of a controlled pressure system which serves to operate a tightening member in the machine in such a way that it will give a final tightening to the assembled parts of the valve stem in conjunction with each tube to exactly the same amount.

Such a control system preferably should be independent of the fluid pressure used therein. It is another object, therefore, of this invention to provide novel means in conjunction with such system to effect this result.

Another object is to provide a machine that is simple to operate and by means of which rapid quantitative production may be effected.

Still another object of this invention is the provision of a novel means whereby the torque exerted by the tightening member is adjustable to any predetermined amount.

A further object is the provision of a fluid-pressure system for operating the machine and of electrically-operated controls for said system.

Yet a further object is the provision in the device of signalling means which will serve to warn the user or operator whenever improperly tightened parts exist in the machine.

Another object is to provide a machine in which the tightened parts may be aligned uniformly with respect to the tube or other part on which they are tightened.

To the accomplishment of the foregoing and such other objects as may hereinafter appear, this invention consists in the novel construction

2 and arrangement of parts hereinafter to be described and then sought to be defined in the appended claims, reference being had to the accompanying drawings forming a part thereof, which show, merely for the purpose of illustrative disclosure, preferred embodiments of the invention, it being expressly understood, however, that changes may be made in practice within the scope of the appended claims without digressing from the inventive idea.

In the drawings, in which similar reference characters denote corresponding parts:

Figure 1 is a side elevation of the machine;

Figure 2 is a front elevation of the machine;

Figure 7 is an enlarged view of a modified construction equipped for operating on valve stems equipped with bridge washers;

Figure 8 is a perspective view of a valve stem having a bridge washer; and

Figure 9 is a diagrammatic view of the pressure system, of component parts thereof and of modified controls therefor for operating the modified construction of Fig. 7.

Figure 3:
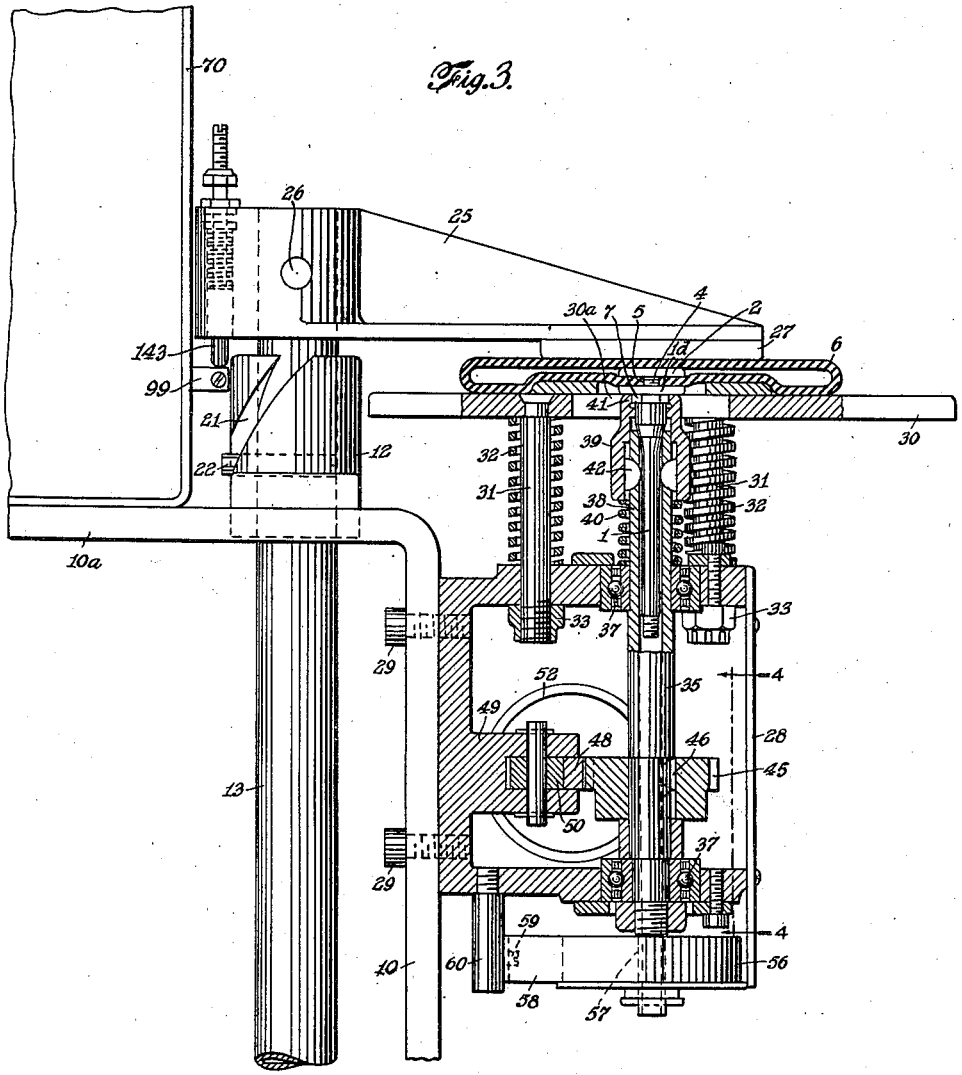
Figure 3 is an enlarged fragmentary vertical section taken along the line 3—3 of Fig. 2, and viewed in the direction of the arrows.

Referring to the drawings, and first to Fig. 3, the valve stem is of conventional construction and comprises two parts, namely, a stem member, or element 1, and a detachable base member 2. The detachable base member 2 has a threaded part 4. This part 4 is inserted through the usual opening 5 of a tire tube 6 from the inside of the latter. Then, the stem member 1 is screwed onto the outwardly-projecting portion of the base member 2 and tightened. This clamps a portion of the tube 6 around opening 5 between the base member 2 and a flange 1d on the stem member 1.

The stem member 1 has a wrench-engaging portion 7 on its external surface. In this embodiment, this portion resembles a hexagonal nut. It may, of course, have other suitable shapes. Heretofore, the assembled parts have been tightened by applying a hand wrench to this portion 7.

As contemplated in the present invention, the tube is cured, and, while still warm, the valve parts are assembled with it, as just described, and made fairly tight by any suitable means, such as a friction spindle. Later on, preferably 24 hours or more thereafter, the so-assembled and partially-tightened parts are delivered to the machine of this invention which embodies the means to give final tightening to the parts with uniform torque, so that the valve-stem parts on each successive tube when removed from the machine are tightened to a uniform extent.

The machine for accomplishing this itself comprises uprights, or frame members 10, of suitable height extending from a base portion 11. These uprights at their upper ends are provided with laterally-extending bent-over portions 10a. The latter are adapted to rest on a suitable table T to which they may be suitably secured. A tubular guide member 12 is suitably supported on the bent-over portions 10a. This guide member slidably supports a tubular rod or member 13. The tube or rod 13 at its lower end is suitably coupled to a lever or treadle 14 by means of a coupling member 15. This coupling member is pivotally secured at 16 to the foot lever 14. It is also secured to the tube 13 in such a way that the latter may rotate on its longitudinal axis while it is given reciprocatory motion on movement of the foot lever or pedal 14. The pedal or lever 14, in turn, is pivoted at 17 to a suitable bearing or support 18, which latter in turn is carried on the base 11 of the uprights 10. Suitable tensioning means, such as a spring 20, is provided. This spring is secured at 20a to the lever 14, and at 20b to one of the uprights 10. It serves to always urge the lever or treadle 14 into the dotted position shown in Fig. 1.

The guide member 12 is provided with a helically-shaped cam slot 21 and the tubular member 13 is provided with a cam follower 22 which is adapted to move in said cam slot 21. In this way, vertical reciprocation of the tube 13 causes rotary motion thereof.

A top pressure pad member, or clamping member 25, is fixed to the tube member 13 suitably at 26. This member 25 is provided with a suitably-attached, cushioning pad 27 of rubber or other equivalent available material for a purpose to be presently described.

A frame or housing 28 is carried suitably by the uprights 10, being supported therefrom in any desirable way, as by the bolts 29. A table or plate member 30 is resiliently supported by and above the housing 28, as by the slidable pins or bolts 31, on which the springs 32 are positioned in such a way as to urge the member 30 upwardly away from the frame or housing 28. Suitable limiting nuts 33 threadedly engage the bolts 31.

A hollow spindle 35 is carried by the housing 28 in the ball-bearings 37. A portion 38 of said spindle 35 projects upwardly of the frame or housing 28. This portion carries a spring 40 thereon. A socket wrench or other suitable tightening member 39 of conventional construction is removably positioned on the portion 38 of the spindle 35 and rests on spring 40. This socket wrench is of conventional construction and has a wrench portion 41 admeasured and shaped to receive the wrench-engaging portion 7 of the stem 1. The said wrench member is slidably keyed to the spindle portion 38, as at 42. The internal diameter of the hollow spindle 35 is so admeasured that the valve stem 1 may be freely inserted into it through the open upper end of the portion 38, and through an opening 30a in table 30.

Means are provided to rotate the spindle 35. To this end, the spindle 35 carries a pinion 45 which is suitably fixed or keyed as at 46 to the said spindle. A rack 48 meshes with the pinion 45. This rack is slidably supported in a suitable guide bracket 49 within the housing 28. Roller bearing 50 is provided to facilitate free sliding of the rack. The rack 48 is adapted to be operated by means of pneumatic or other fluid pressure. To this end, a suitable pressure cylinder 52 is supported from the frame or housing 28 in axial alignment with the rack 48. The cylinder has a piston 53 therein to which the rack member is coupled as at 54. The pressure cylinder 52 is provided with an inlet nozzle 55 to which air, or other fluid under pressure, may be delivered. A spiral spring 56 is carried on a portion 57 of the spindle 35. This spring has one end 58 attached at 59 to a fixed support 60. The inner end of the spring is attached to the portion 57 of the spindle in any suitable way. This spring serves to tend to return the movable parts associated with the spindle 35 to original position upon removal or release of pressure in the cylinder 52. Other suitable return means may be used.

A control box 70 is suitably attached to the bent-over portions 10a of the uprights 10. This control box contains the control elements of the pressure system in a compact manner. These control elements comprise a solenoid-operated three-way valve 71 of conventional construction, a pressure switch 72 of conventional construction, a main switch 73 of conventional construction, a solenoid 74 of conventional construction, and the requisite couplings, conduits and electrical wiring necessary to operate the pressure system.

The solenoid-operated three-way valve 71, may, for example, be one manufactured by the Automatic Switch Corporation and known as the type P37XAA, form F. This valve has an inlet A, an exhaust outlet B, and a delivery outlet C. It also has a solenoid 76 for operating it. Normally, the valve 71 is biased by any conventional means such as a spring (not shown) or the like so that with the solenoid deenergized, the inlet A is closed to pressure from a supply line and the passageway between C and B is open. When the solenoid 76 is energized, the passageway between inlet A and delivery outlet C is opened while the exhaust outlet B is closed. The valve is returned automatically to the normal position wherein inlet A is closed to pressure from the supply line through the action of conventional biasing means when the solenoid is deenergized. Any other suitable solenoid-controlled three-way valve may be used, that described being merely by way of an example.

The pressure switch 72 is also of conventional construction. In the embodiment shown (Fig. 6) it comprises a casing 80. This casing contains a bellows member 81 which has an inlet 82. A plunger member 83 is in engagement with the bellows 81 and is provided with a suitable electrical contact 84. The plunger member and its contact 84 are movable toward and away from a stationary electrical contact 85. A suitable spring 86 surrounds the plunger member 83 and tends normally to collapse the bellows 81, maintaining the contacts 84 and 85 apart, or in open circuit. Suitable means, illustrated diagrammatically by the manipulating disc 87, serve to regulate the spring 86. This regulation varies the inflation pressure necessary in the bellows 81 to cause engagement between the contacts 84 and 85. Any other suitable pressure switch that can be regulated or adjusted may be used.

The main switch 73 is of conventional construction and of the single-pole normally-open circuit type. It comprises a casing 90 which contains a movable contact 91 and a stationary contact 92. An operating plunger 93 extends outwardly of the casing. When this plunger is depressed it moves contact 91 into engagement with contact 92 closing the switch. When pressure is released the plunger moves outwardly and contact 91 moves away from contact 92, opening the switch. Any other suitable switch may be used.

The solenoid 74, which is used in conjunction with, and to control, the switch 73, comprises a solenoid coil 95 and a solenoid plunger 96. The latter is normally urged outwardly of the coil, as by a spring 97, when the solenoid is deenergized.

Switch 73 is suitably positioned in the control box with its plunger 93 extending upwardly. The solenoid 74 is positioned in the control box with its solenoid arranged out of axial alignment with the plunger 93. The solenoid plunger has a yoke member 97' that normally engages a stop member 98 suitably attached to the casing 90. This stop member limits the outward stroke of said plunger 96. A trip lever 99 is pivotally connected to the yoke member. It has a part 99a that extends over the plunger member 93. The lever 99 also extends outwardly of the control box 79. A suitable spring 99b serves to so maintain the trip lever 99 with respect to plunger 93 that switch 73 is normally open.

The parts just described are adapted to be connected as follows:

Air, or other fluid under pressure, is delivered from a source (not shown) to the inlet 100 of an air strainer 101 of conventional construction. The outlet 102 of this air strainer is connected by a conduit 103 to the inlet A of the three-way valve 71. The delivery outlet C of the three-way valve 71 is connected by a conduit 104 to the branch 105 of a suitable coupling member 106. Another branch 107 of the coupling member 106 is connected by a conduit 108 to a conventional pressure gauge 109 of any known construction. A third branch 110 of the coupling member 106 is connected by a conduit 111 to one branch 112 of a coupling member 113. Another branch 114 of the coupling member 113 is connected by a suitable conduit or hose 115 to a branch 120 of a coupling member 121. A branch 122 of this coupling member 121 is suitably connected to the nipple 55 leading to the pressure cylinder 52. A third branch 123 of the coupling member 121 is fitted with a suitable normally-open, one-way valve 130.

The branches 122, 123 of the coupling member 121 are in axial alignment. A plunger rod 131 extends from the piston 53 through the nipple 55 into engagement with the valve 130. This rod normally tends to press the valve 130 onto its seat 132 against the operation of the valve spring 133 for a purpose to be presently described.

The coupling member 113 also has a branch 116 which is connected by a suitable conduit 117 to the inlet 82 of the pressure switch bellows 81.

The solenoid 76 of the three-way valve 71 is connected in electrical series with the contacts 91, 92 of the main switch 73, and with the conduits 135, 136 of the power source P by suitable electrical connecting members 137, 138, 139. The switch-control solenoid 95 is connected in series with the contacts 84, 85 of the pressure switch 72 and the conduits 135, 136 of the power source P by the respective electrical connecting members 140, 141 and 142.

As mentioned above, the trip lever 99 extends outwardly of the control box, as shown in Figs. 1 and 3, and extends into the path of an adjustable trip member 143. The trip member 143 is adjustably and resiliently positioned in any suitable manner on the pressure pad member 25. In this way, energization of the solenoid 76 of the three-way valve 71 is made dependent upon the position of the pressure-pad member 25.

The operation of the machine is as follows:

In the normal position of the parts the pressure-pad member 25 is swung away from over the socket wrench 39 and the cam follower 22 is located at the upper end of the groove 21 in the guide 12. At this time, too, the piston 53 is in the position shown in Fig. 4; that is, at the extreme right end of its stroke. Also, at this time, the contacts 91 and 92 of the main switch 73 are apart, as are the contacts 84, 85 of the pressure switch 72. In addition, the three-way valve is closed at its inlet A, so that, the fluid pressure from the source, entering the air strainer 101, cannot pass to the system.

With this static condition of the parts, the operator inserts the stem member 1 of a valve stem into the spindle 35 through its upper end until the flange 1d rests on the socket wrench 39. The tire tube 6, associated with the valve stem, then rests on the table or plate member 30. The balance of the tube overhangs the table and is supported by the tube rest 148.

The operator then depresses the lever or foot pedal 14 to the full-line position shown in Fig. 1. This draws the rod 13 downwardly. Because of the engagement of the cam follower 22 in the cam slot 21, the pressure-pad member 25 swings into alignment over the spindle 38, and its pad 27 presses or bears downwardly against the tube 6. Sufficient counterpressure is developed by the resistance of the resiliently-supported table 30 and the resiliently-supported socket wrench 39 to prevent any slipping of the base member 2 inside the tube 6.

Just at about the time the pressure-pad member 25 reaches the aforedescribed pressing position, the trip member 143 engages and operates the trip lever 99 to close the switch 73. The closure of switch 73 causes the solenoid 76 of the three-way valve 71 to be energized. This energization opens inlet A of the valve 71 to air, or other fluid pressure, delivered to strainer 101, and also permits free passage of this pressure through the delivery outlet C of the valve to the conduit 104. Exhaust outlet B of the valve is then closed. From the conduit 104, the pressure is led through the conduits 111 and 115 and through the coupling member 121 to the pressure cylinder 52. At the instant when air pressure reaches the coupling member 121, the valve 130 is maintained on its seat by the plunger rod 131, so that, the air pressure is forced to enter the cylinder 52 and to actuate piston 53, thereby moving the rack member 48 toward the left of Fig. 4. Such movement of the rack member 48, because of its engagement with the rack pinion 45, causes rotation of the spindle 35. This rotation imparts a tightening movement to the socket wrench 39 and thereby tightens the stem member 1 with respect to the base member 2.

The pressure conduit 117 branches from the conduit 111 so that the same pressure exists in said conduit, and in bellows 81, as in the conduits 111 and 115. This pressure will not be sufficient to actuate the bellows until sufficient torque is exerted on the stem parts. As the piston moves toward the left, it encounters more resistance because of the increasing resistance encountered by the rotating socket wrench 39 as the latter tightens the stem parts. The increasing resistance to motion of the piston 53 builds up pressure in the conduit 115 and in the conduit 117, so that the pressure in the bellows increases. When this pressure equals or exceeds the setting of the pressure switch, the bellows expands and moves to close the circuit of the solenoid 74 through the contacts 84 and 85. As soon as this occurs, the solenoid plunger 96 is drawn into its solenoid 95 against the resistance of its spring 97. Such movement of the plunger 96 lifts the trip lever 89 sufficiently to permit plunger 93 to rise and to open the circuit of the solenoid 76 at the switch 73. This immediately cuts off air pressure at the inlet A of the three-way valve 71 and permits the pressure system to bleed both through the outlet B of the three-way valve 71, and around the exhaust valve 130, which becomes unseated when the air pressure drops sufficiently for spring 133 to open it as the rod 131 is out of engagement with it. The operator then lifts his foot from the treadle 14 and the spring 20 causes the lifting of the clamping or pressure-pad member 27 from its engagement with the tube 6 on table 30 and its return to original out-of-the-way position. The operator then removes the tube and its tightened valve-stem parts from the machine. Since the bleeding just described can take place, the spiral spring 56 then acts to restore the piston 53 and rack 48 to the condition shown in Fig. 4. Initial conditions are then restored in the entire machine and the same sequence of operations are carried out on the next tube- and valve-stem assembly.

It will be seen that, with the machine and the pressure system just described, the amount of tightening torque exerted by the socket wrench 39 will always be equal for any given setting of the pressure switch 72, regardless of the air pressure delivered to the strainer 101, providing that the latter pressure is always greater than that necessary to give the desired torque at the socket wrench 39. This is true because the pressure switch 72 then always closes on the existence of a determined pressure in the bellows 81. That determined pressure occurs each time the socket wrench encounters a specific resisting force in its tightening action on the valve-stem parts. In effect, therefore, the pressure available to operate the piston 53 is determined by the setting of the pressure switch 72, irrespective of the pressure of the source, provided the latter is higher. The setting can be changed.

If the valve parts have been insufficiently tightened before they are inserted into the machine, the limited movement available to the rack member 48 will be insufficient to cause the necessary final tightening. As a result, the rack member will tend to overtravel, i. e., move more than usually necessary for such final tightening, and its end 48a will serve to actuate a suitable switch 145 supported from the housing 146. The switch is connected in any suitable way in an electrical circuit, including a signal lamp or bell 147. The signal, e. g., lighting of the lamp or ringing of the bell, at any time during the operation of the machine, will serve as a warning to the operator that the particular valve stem 1 in the machine at the moment has not received the necessary preliminary hand or final tightening, with respect to its base member 2.

On certain types of tires it is essential to use stems 1a (Fig. 8) equipped with a so-called "bridge washer" 1b attached to the stem. This "bridge washer" is usually made of sheet metal having generally rectangular shape and has to be positioned with respect to the tube so that the sides of the "bridge washer" are parallel with the sides of the tube. Using the machine described above, very few stems would have their "bridge washers" properly aligned with air cut-off occurring when the required torque has been applied. It becomes necessary therefore to provide additional means for rotating the stem 1a, its base 2a and "bridge washer" relative to the tube after the required tightening torque has been applied to align the "bridge washer" properly with respect to the tube.

This may be accomplished simply by the additional mechanism and circuit connections shown in Figs. 7 and 9 without requiring any changes in other structural details of the machine hereinbefore described.

Fig. 7 is a top plan view of the spring pad or table 30 of Fig. 3 and an end view of the valve stem 1a with its attached "bridge washer" 1b. The stem is shown inserted into the socket wrench ready for tightening onto an inner tube but the latter is omitted for clarity.

Suitably attached to the underside of spring pad 30 are a solenoid 150, a switch 155 (similar in construction to switch 73) and a switch operating lever 158. The armature 151 of the solenoid 150 is pivotally connected at 152 to a link 153. The latter is pivotally connected at 154 to the operating lever 158. The lever 158 at its opposite end is slotted at 159. A pin 160 depending from the pad 30 extends through said slot serving both to support and to guide the lever 158 at this opposite end. A suitable tension spring 161 attached to lever at 162 and to a pad 30 at 163 serves normally to maintain the lever 158 in the dotted line position of Fig. 7, i. e. with the pin 160 in engagement with the left hand end of slot 159. A projection 164 provided on lever 158 is at this time spaced from the operating plunger 156 of the switch 155 so that the contacts 157, 158 of the latter are separated, or in open position.

The lever 158 has another projection or pin 166 which is positioned to lie clear of the "bridge washer" 1b when lever 158 lies in the dotted line position of Fig. 7.

When the solenoid 150 is actuated as will be presently described, the lever 158 is swung by the linkage 153 to bring the projection or pin 166 into the path of movement of a flange 1c of the "bridge washer" 1b and when the two engage, further movement of such flange moves the lever 158 toward the left of Fig. 7, bringing projection 164 into engagement with the switch plunger 156 to close the switch 155. The admeasurement of lever 158 and the position of its projections 164, 166 are such that switch 155 is closed when the "bridge washer" assumes the position shown in Fig. 7 at which time it is properly aligned with the tube. At this time the lever 158 is in the dot-dash line position shown in Fig. 7.

Figure 6:
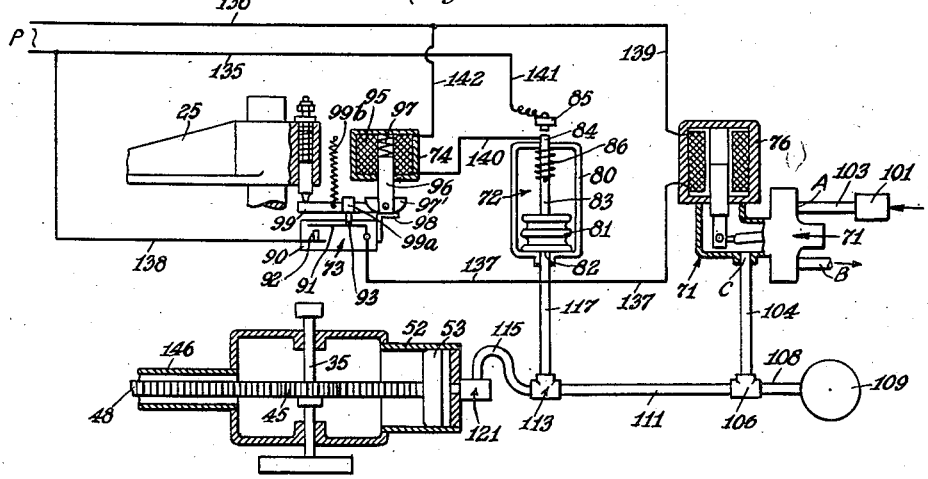
Figure 6 is a diagrammatic view of the pressure system, of component parts thereof, and of controls therefor.

The solenoid 150 and switch 155 are connected with the other parts of Fig. 6 in the manner illustrated in Fig. 8 wherein all parts having reference numerals like those of Fig. 6 are similar.

The solenoid 76 of the three way valve 71 is connected in electrical series with the contacts 91, 92 of the main switch 73 and with the conduits 135, 136 of the power source P by suitable electrical connecting members or wirings 137, 138, 139. The control solenoid 95 of the switch 73 is connected in electrical series with the contacts 157, 158 of the switch 155 (carried by spring plate 30) and the conduits 135, 136 of the power source P by the respective electrical connecting members or wirings 170, 171, 172, 173. The contacts 84, 85 of the pressure switch 72 are connected in electrical series with the solenoid 150 (carried by the spring pad or table 30) and with the conduits 135, 136 by the respective electrical connecting members or wirings 174, 175, 176 and 173.

In operation, assume that a stem 1a equipped with a "bridge washer" assembled with a tube has been inserted into the socket wrench 39 and the operator has depressed foot lever 14 so that machine parts occupy the position shown in Fig. 3.

At this time the trip member 143 engages and operates the trip lever 99 to close the contacts 91, 92 of the main switch 73. This closure energizes the solenoid 76 of the three-way valve 71. This energization opens inlet A of the valve 71 to pressure delivered to strainer 191 and permits free passage of this pressure through outlet C of the valve to conduit 104. Exhaust outlet B of the valve 71 is then closed. From conduit 104, the pressure is led through the conduits 111 and 115 and through the coupling member 121 to the pressure cylinder 52 causing rack member 48 to be operated as previously described and consequently rotating spindle 35 and imparting tightening rotation to the socket wrench 39 in the direction of the arrow shown in Fig. 7, thereby tightening the stem member 1a with respect to its base member 2a.

The same pressure exists in conduit 111 and in bellows 81 as previously described. As the piston 52 encounters increasing resistance during the tightening action, the pressure built up in bellows 81 ultimately closes the circuit through contacts 84, 85, thereby energizing the solenoid 150 (carried by table 30). As soon as this occurs, the armature 151 of the said solenoid moves the lever 158 to bring its projection 166 into the path of rotation of a flange 1c of the "bridge washer" 1b which is still capable of rotation with respect to the tube under action of the socket wrench 39. The tube is held against rotation by the pressure pad 27. When the flange 1c and the projection 166 engage, the lever 158 is moved to the left of Fig. 7, bringing projection 164 into engagement with plunger 156 of the switch 159 carried by the table 30. Such engagement closes the circuit through contacts 157, 158 of the latter switch and the solenoid 74. As soon as this occurs, the solenoid plunger 96 is drawn into its solenoid 95 against the resistance of spring 97. Such movement lifts the trip lever 99 sufficiently to permit plunger 93 to rise and to open the circuit of valve solenoid 76 at the main switch 73. This immediately cuts off pressure at the inlet A of the valve 71 and permits the pressure system to bleed as previously described stopping rotation of the socket wrench 39. This rotation stops just when the "bridge washer" 1b becomes properly aligned as shown in Fig. 7. At this time proper tightening torque also has been applied to the stem parts 1a, 2a with respect to the tube.

Figure 4:
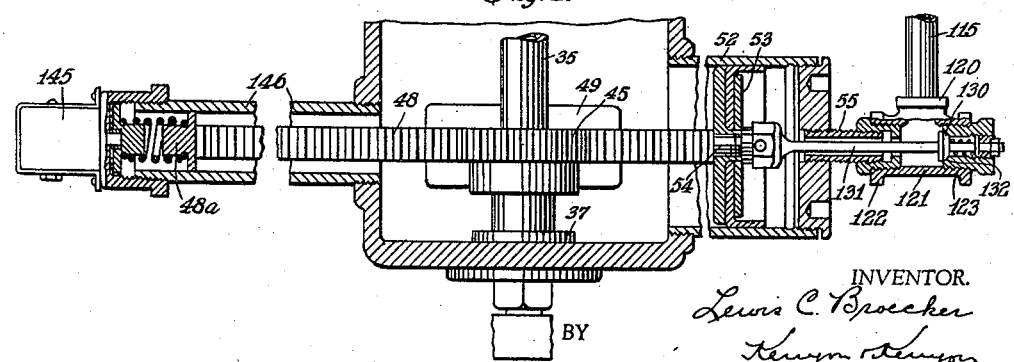
Figure 4 is a section taken along the line 4—4 of Fig. 3 and viewed in the direction of the arrows.
Figure 5:
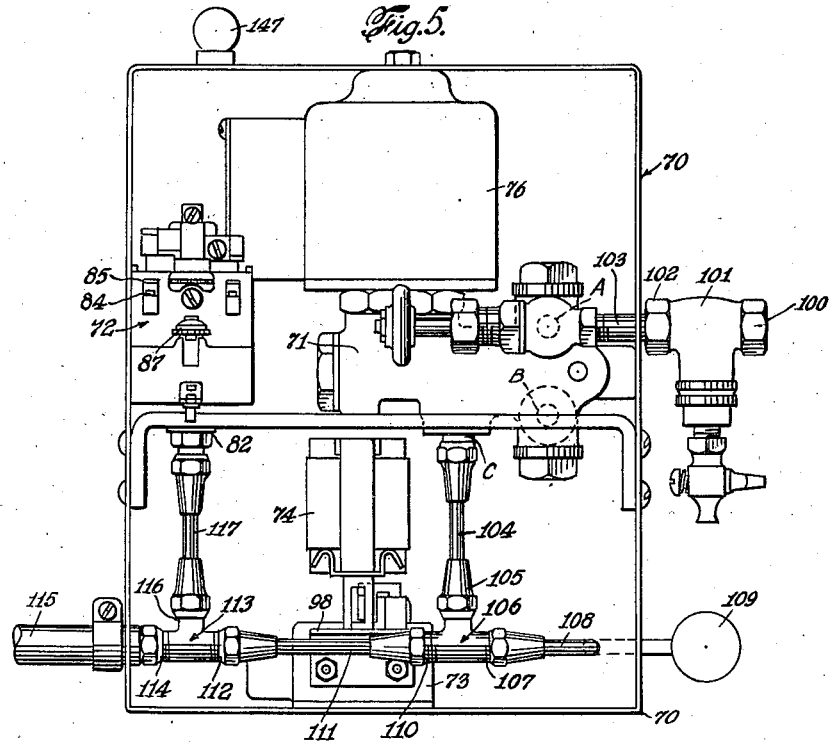
Figure 5 is a schematic view of the control box used with the machine.

The operator then lifts his foot from the treadle 14, removes the tube and its tightened aligned valve stem parts from the machine and the wrench 39 and associated parts return to their initial positions as previously described and as shown in Figs. 4, 7 and 8. Initial conditions then exist and the same sequence of operations can be carried out on the next tube and valve-stem assembly.

While the machine has been described as particularly effective in connection with the tightening of valve-stem parts and tubes, it should be understood that it has application to the tightening of other parts, wherein a final, uniform tightening torque is necessary.

It is to be understood, too, that structural variation within the scope of the appended claims is contemplated. There is no intention of limitation to the exact details shown and described.

What is claimed is:

1. In a device for uniformly tightening valve-stem parts or the like on a tire tube or the like, tightening means adapted to act on one of said parts, a table member, a clamping member movable reciprocally toward and away from said table member and being rotatable about the axis of reciprocation, said clamping member serving to maintain another of said parts and said tube stationary during tightening action by said tightening means, means for moving said clamping member reciprocally, cam means for rotating said clamping member about said axis of reciprocation during the reciprocal motion, means to operate said tightening means, and means to control said operating means to effect uniformity of tightening action by said tightening means.

2. In a device for uniformly tightening valve-stem parts or the like on a tire tube or the like, rotatable tightening means adapted to act on one of said parts, a resiliently-supported table member, a clamping member movable into and out of clamping engagement with said table member and serving to maintain another of said parts and said tube stationary during tightening action by said tightening means, means for so moving said clamping member, gear means to rotate said tightening means, pressure-actuated means to operate said gear means, and adjustable, means whereby to effect uniformity of tightening action by said tightening means.

3. In a device for uniformly tightening valve-stem parts or the like on a tire tube or the like, rotatable tightening means adapted to act on one of said parts, a resiliently-supported table member, a clamping member movable into a clamping position with respect to said table member and in such position serving to maintain another of said parts and said tube stationary during tightening action of said tightening means on said one of said parts, foot-operated means for so moving said clamping member, gear means to rotate said tightening means, fluid pressure-actuated means to operate said gear means, means controlled by said foot-operated means for delivering fluid under pressure to said pressure-actuated means, and pressure-responsive means to cut off delivery of said fluid when a predetermined torque has been exerted by said tightening means.

4. In a device for uniformly tightening threaded valve stem parts together on a tire tube, one of said parts having a wrench receiving portion and an elongated portion, a rotatable hollow member adapted to receive said elongated portion, a wrench carried by said rotatable member and adapted to engage said wrench receiving portion, a table member for supporting said tube, a clamping member movable reciprocally and rotatably with respect to said table member and adapted to prevent rotation of said tube and the other of said valve stem parts during action of said wrench on said wrench receiving portion, means to rotate said wrench and said hollow member, means to operate said clamping member, and means to limit the torque applied by said wrench to a predetermined amount.

5. In a device for uniformly tightening threaded valve stem parts together on a tire tube, one of said parts having a wrench receiving portion and an elongated portion, a rotatable hollow member adapted to receive said elongated portion, a wrench resiliently carried by said rotatable member and adapted to engage said wrench receiving portion, a resiliently supported table member for supporting said tube, a clamping member movable reciprocally and rotatably with respect to said table member and adapted to prevent rotation of said tube and the other of said valve stem parts during action of said wrench on said wrench receiving portion, pressure-actuated means to rotate said wrench, means to rotate said clamping member into and out of alignment with said rotatable hollow member, means to move said clamping member toward and away from said tube, and means to limit the torque applied by said wrench to a predetermined amount.

6. In a device for uniformly tightening valve stem parts together on a tire tube, one of said parts having a wrench receiving portion and an elongated portion, a rotatable hollow member adapted to receive said elongated portion, a wrench resiliently carried by said rotatable member and adapted to engage said wrench receiving portion, a resiliently supported table member for supporting said tube, a clamping member movable reciprocally and rotatably with respect to said table member and adapted to prevent rotation of said tube and the other of said valve stem parts during action of said wrench on said wrench receiving portion, pressure-actuated means to rotate said wrench, means to rotate said clamping member into and out of alignment with said rotatable hollow member, means to move said clamping member reciprocally with respect to said table member, means carried by said table member responsive to the position of an element of one of said valve stem parts, and means controlled by said last-named means to limit the torque available through action of said pressure-actuated means, whereby a predetermined positioning and tightening of said valve stem parts on said tube is effected.

LEWIS C. BROECKER.

REFERENCES CITED

The following references are of record in the file of this patent:

UNITED STATES PATENTS

| Number | Name | Date |
|---|---|---|
| 1,979,966 | Farr, et al. | Nov. 6, 1934 |
| 1,732,038 | Connell, et al. | Oct. 15, 1929 |
| 1,812,816 | Weaver | June 30, 1931 |
| 1,846,638 | Gardiner, et al. | Feb. 23, 1932 |
| 2,292,146 | Meunier | Aug. 4, 1942 |
| 1,144,974 | Weaver | June 29, 1915 |
| 826,179 | Marshall | July 17, 1906 |
| 2,093,909 | Dodge | Sept. 21, 1937 |
| 1,047,986 | Raiche | Dec. 24, 1912 |
| 1,927,583 | Ernst | Sept. 19, 1933 |
| 1,741,988 | Hynes | Dec. 31, 1929 |
| 1,823,426 | Ferris | Sept. 15, 1931 |
| 1,935,441 | Fuller | Nov. 14, 1933 |
| 1,907,538 | Hanna | May 9, 1933 |
| 2,356,366 | Wise | Aug. 22, 1944 |